United States Patent [19]

Shepherd et al.

[11] Patent Number: 5,393,090
[45] Date of Patent: Feb. 28, 1995

[54] FABRIC HOUSING FOR AIR BAG INFLATOR

[75] Inventors: Jeffrey A. Shepherd, Troy; James K. Conlee, Dayton, both of Ohio

[73] Assignee: General Motors Corporation, Detroit, Mich.

[21] Appl. No.: 172,205

[22] Filed: Dec. 23, 1993

[63] Continuation-in-part of Ser. No. 70,515, Jun. 2, 1993, abandoned.

[51] Int. Cl.⁶ ............................................. B60R 21/16
[52] U.S. Cl. ............................ 280/728 A; 280/728 R; 280/743 R
[58] Field of Search ........... 280/728 R, 728 A, 743 R, 280/732

[56] References Cited

U.S. PATENT DOCUMENTS

| | | | |
|---|---|---|---|
| 3,792,873 | 2/1974 | Buchner et al. | 280/743 R |
| 5,069,480 | 12/1991 | Good | 280/728 A |
| 5,096,222 | 3/1992 | Komerska et al. | 280/732 |
| 5,149,130 | 9/1992 | Wooley et al. | 280/743 R |
| 5,186,492 | 2/1993 | Wright et al. | 280/728 A |
| 5,234,227 | 8/1993 | Webber | 280/728 R |
| 5,284,358 | 2/1994 | Rhein | 280/728 A |

*Primary Examiner*—Eric D. Culbreth
*Attorney, Agent, or Firm*—Charles E. Leahy

[57] ABSTRACT

A new and improved air bag module of lightweight construction includes a rectangular support frame defining an open mouth for the mounting of an air bag and having spaced apart opposing end walls and spaced apart opposing side walls. An inflator support depends from each of the end walls of the rectangular support frame to support the inflator beneath the support frame. A liner of flexible sheet material, such as air bag material, has a rim portion adapted for attached to the support frame and a side wall portion suspended from the support frame and reaching between the spaced apart inflator supports whereby upon actuation of the inflator, the inflation gas is contained by the liner and exhausted through the open mouth. In a preferred embodiment, the liner of flexible sheet material has end walls and side walls which are suspended from the support frame and surround the inflator. A support loop may be provided intermediate the inflator supports to control outward expansion of the liner by the inflation gas. The support loop may be a metal strap attached to the support frame, or a loop of flexible sheet material sewn to the rim portion of the liner.

8 Claims, 3 Drawing Sheets

FABRIC HOUSING FOR AIR BAG INFLATOR

This is a continuation-in-part of Ser. No. 08/070,515, filed on Jun. 2, 1993, now abandoned.

The invention relates to a housing for mounting a folded air bag and an air bag inflator beneath the instrument panel, and more particularly provides a lightweight fabric housing for the inflator.

BACKGROUND OF THE INVENTION

It is well known to provide an air bag module mounted within the instrument panel structure. The air bag module includes a housing which mounts an inflator actuable to produce inflation gas for inflating an air bag mounted on the housing. The housing is conventionally of stamped sheet metal construction and includes a U-shaped cross section defined by side walls and end walls which connect the side walls. A hole is conventionally provided in one of the end walls to permit the insertion of a cylindrically shaped inflator into the housing. The housing typically includes a flange extending around the side walls and end walls at the upper margin thereof by which the module may be conveniently attached to the instrument panel structure. The air bag may be attached to the flange or alternatively, the air bag may extend into the housing and wrap around the inflator.

SUMMARY OF THE INVENTION

The present invention provides a new and improved air bag module of lightweight construction.

In particular, the air bag module includes a rectangular support frame defining an open mouth for the mounting of an air bag and having spaced apart opposing end walls and spaced apart opposing side walls. An inflator support depends from each of the end walls of the rectangular support frame to support the inflator beneath the support frame. A liner of flexible sheet material, such as air bag material, has a rim portion adapted for attachment to the support frame and a side wall portion suspended from the support frame and reaching between the spaced apart inflator supports whereby upon actuation of the inflator, the inflation gas is contained by the liner and exhausted through the open mouth.

In a preferred embodiment, the liner of flexible sheet material has end walls and side walls which are suspended from the support frame and surround the inflator. A support loop may be provided intermediate the inflator supports to control outward expansion of the liner by the inflation gas. The support loop may be a metal strap attached to the support frame, or a loop of flexible sheet material sewn to the rim portion of the liner.

BRIEF DESCRIPTION OF THE DRAWINGS

These and other objects and features will become apparent upon consideration of the description of the preferred embodiment and the appended drawings in which.

DESCRIPTION OF THE PREFERRED EMBODIMENT

Figure 1:
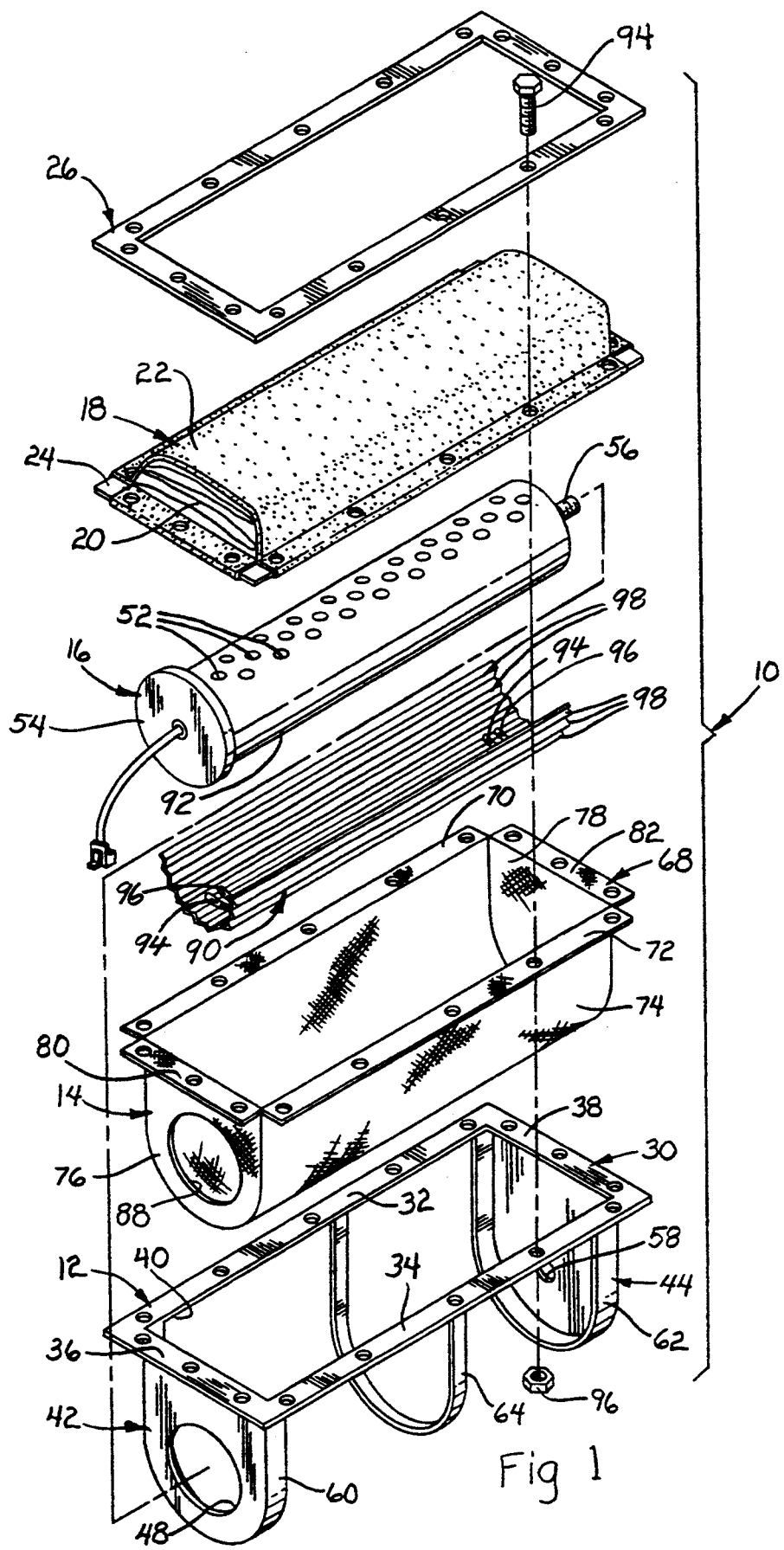
FIG. 1 is an exploded perspective view of an air bag module according to the invention.

Referring to FIG. 1, it is seen the components of the improved air bag module of this invention include a support 12, a fabric liner 14, a conventional inflator 16, an air bag assembly 18 including a folded air bag 20, plastic cover 22 and a sheet metal retaining ring 24, and a retaining ring 26.

The support 12 includes a rectangular support frame 30 of stamped sheet metal construction including spaced apart side walls 32 and 34 and spaced apart end walls 36 and 38 which define an open mouth 40. The support 12 also includes inflator supports 42 and 44 of stamped sheet metal which depend downwardly from support frame 30 and may be stamped integral with the support frame 30 or may be suitably attached thereto as by welding. The inflator support 42 has a large round opening 48 which permits the insertion of the inflator 16. The inflator 16 is a cylinder shaped body having outlet ports 52, a flange 54 at the one end, and a threaded stud 56 at the other end.

The inflator support 44 has a bolt aperture 58 for receiving the threaded stud 56 of the inflator 16. The inflator support 42 is stiffened and reinforced by a lateral extending flange 60. The inflator support 44 also has a stiffening and reinforcing flange 62. In addition, the housing 12 has a center support loop 64 of sheet metal construction which is suitably welded or otherwise attached to the laterally spaced apart side walls 32 and 34.

It will be appreciated that the inflator supports 42 and 44 will support the inflator 16 on the support 12 in spaced relation below the rectangular support frame 30. Furthermore it is seen that the flanges 60 and 62 of the inflator supports 42 and 44, and the support loop 64 are spaced away from the inflator 16.

The liner 14 is sewn of a suitable fabric or other flexible sheet material and includes a rim portion 68 having side mounting flaps 70 and 72 continuous with a side wall portion 74 of generally U-shaped cross section. The side wall portion 74 is maintained in the U-shaped cross section by end walls 76 and 78. The rim portion 68 includes an end flap 80 integral with the end wall 76 and an end flap 82 integral with the end wall 78.

The liner 14 is generally coextensive in shape and size with the support 12 so that the liner 14 can be dropped vertically into the housing as shown in FIG. 1. In addition, the liner 14 has a round opening 88 in the end wall 76 which registers with the round opening 48 of the inflator support 42. Likewise, the end wall 78 of the liner has an aperture, not shown, which registers with the bolt aperture 58 of the inflator support 44.

A heat shield 90 of thin gauge corrugated sheet metal is located within the fabric liner 14 to space the liner 14 from the cylindrical wall 92 of inflator 16. The heat shield is preferably of aluminum and is held in place by sewing, as by threads 94 and 96 which pierce through the liner 14 and heat shield 90. The corrugations 98 of the heat shield provide support and space the liner 14 at a distance from the inflation.

Accordingly, it will be appreciated that the module 10 is assembled by first dropping the liner 14 vertically down as viewed in FIG. 1 into the support 12 so that the rim portion 68 of the liner 14 will overlie the rectangular support frame 30, the liner end walls 76 and 78 will abut the housing inflator supports 42 and 44, and the side wall portion 74 of the liner will abut the stiffening flanges 60 and 62 and the inflation supports 42 and 44, as well as abutting the support loop 64.

The air bag assembly 18 is lowered atop the liner and the retaining ring 26 is lowered atop the air bag assembly 18. The assembly is completed by installing a plurality of attaching bolts, one of which is shown at 94. The bolt installs through aligned apertures provided in the retaining ring 26, the air bag assembly 18, the rim portion 68 of the liner 14, and the rectangular support frame 30. A nut 96 is then installed.

Figure 2:
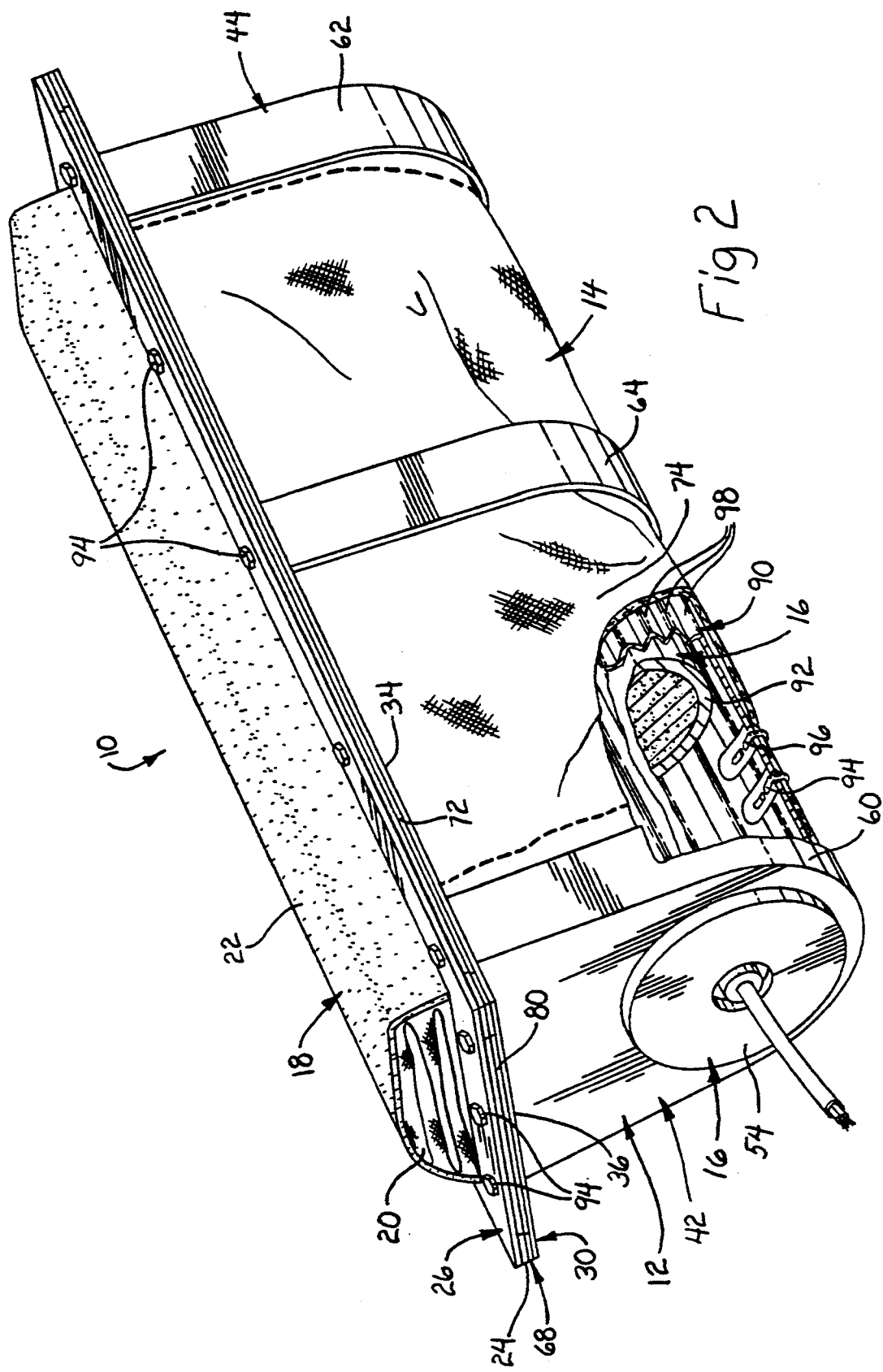
FIG. 2 shows the air bag module of FIG. 1 fully assembled for installation in a vehicle.

FIG. 2 shows the completed assembly and it is appreciated that the module assembly 10 is of lightweight construction as compared to conventional air bag assemblies by virtue of the fact that the housing for containing inflation gas is furnished by the fabric liner 14 instead of continuous metal walls of the module housing.

Upon actuation of the inflator, the inflation gas will be contained by the liner 14 and directed to the air bag assembly 18 for unfolding the air bag 20. It will be appreciated that the liner 14 may be constructed of many different fabric materials. For example, the liner may be constructed of the same material as the air bag 20. Furthermore, the liner 14 may be chosen of a material having a tightweave and suitable coating to be substantially impervious to inflation gas therethrough, or selected from various looseweave materials which would vent inflation gas from the module. In addition the liner 14 may be constructed of a material which stretches under pressure of the inflation gas to act as a pressure responsive relief valve by venting gas thereto in response to the magnitude of pressure experienced inside the module. Some examples of materials which may stretch under pressure to vent inflation gas are neoprene rubber and silicon rubber, as well as some knit synthetic fibers, such as nylon or rayon.

Figure 3:
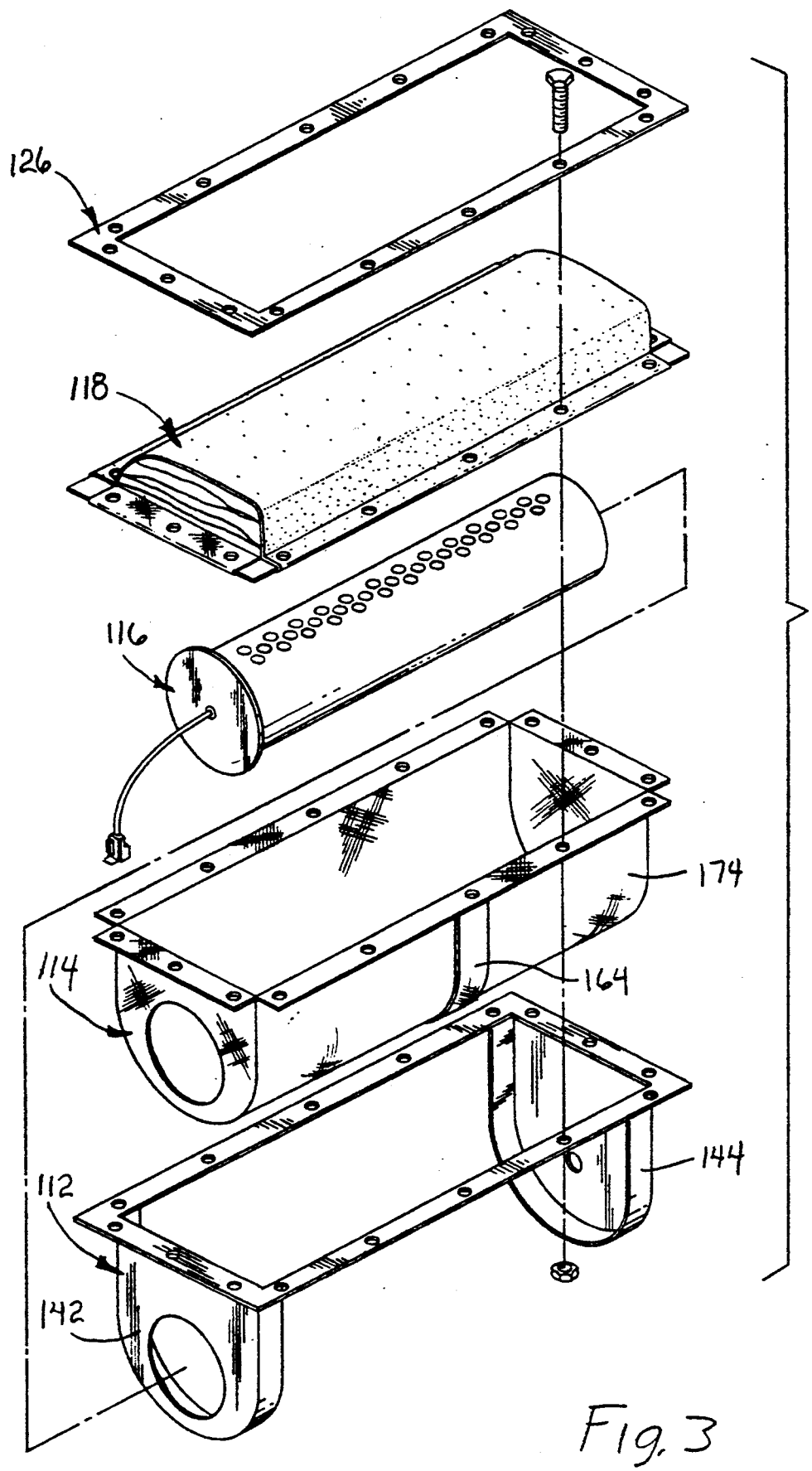
FIG. 3 is a view similar to FIG. 1 but showing a second embodiment of the invention.

FIG. 3 shows a second embodiment of the invention comprised of a support 112, liner 114, inflator 116, air bag assembly 118 and retainer ring 126.

The support 112 is generally similar to that of the support 12 of FIG. 1 but omits the provision of a metal support loop intermediate the inflator supports 142 and 144.

The liner 114 is generally similar to the liner 14 of FIG. 1, with the addition of a support loop 164 thereto. The support loop 164 is preferably a strap of flexible material and is sewn to the side wall portion 174 of the liner 114. The support loop 164 will serve to reinforce the liner 114 in a manner similar to the reinforcing provided by the metal loop 64 of FIG. 1.

It will be appreciated that additional metal support loops 64 of FIG. 1, and/or fabric support loops 164 of FIG. 3 may be employed in conjunction with this invention as may be required to suitably support the liner 114. Depending on the liner material chosen, such supports may not be required and may be eliminated completely.

Thus, it is seen that the invention provides a new and improved fabric lined housing for a vehicle air bag assembly.

The embodiments of the invention in which and exclusive property or privilege is claimed are defined as follows:

1. An air bag module for a motor vehicle, comprising:
a cylindrical inflator having spaced apart end walls and a cylindrical side wall;
a support frame defining an open mouth for the mounting of an air bag and having spaced apart opposing end walls and spaced apart opposing side walls;
an inflator support depending from each of the end walls to support the inflator beneath the support frame and being spaced away from one another;
an air bag mounted on the support frame;
a liner of flexible sheet material independent of the air bag having a rim portion adapted for attachment to the support frame and having a side wall portion suspended from the support frame and reaching between the spaced apart inflator supports whereby upon actuation of the inflator the inflation gas is contained by the liner and exhausted through the open mouth to inflate the air bag.

2. An air bag module for a motor vehicle, comprising:
a cylindrical inflator having spaced apart end walls and a cylindrical side wall;
a rectangular support frame defining an open mouth for the mounting of an air bag and having spaced apart opposing end walls and spaced part opposing side walls;
an inflator support depending from each of the end walls to support the inflator beneath the support frame and being spaced away from one another;
an air bag mounted on the support frame;
a liner of flexible sheet material for capturing inflation gas from the inflator so that inflation gas exits the module through the open mouth, said liner being independent of the air bag and having a rim portion for attachment to the support frame and having end walls and side walls suspended from the support frame and surrounding the inflator in substantial gas impervious relation.

3. The combination of claim 2 further characterized by one of the inflator supports and the corresponding end wall of the liner having aligned openings therein through which the inflator may be installed into the module.

4. An air bag module for a motor vehicle, comprising:
a cylindrical inflator having spaced apart end walls and a cylindrical side wall;
a rigid rectangular support frame defining an open mouth for the mounting of an air bag and having spaced apart opposing end walls and spaced apart opposing side walls;
an air bag mounted on the support frame;
an inflator support depending from each of the end walls to support the inflator beneath the support frame and being spaced away from one another;
a liner of flexible sheet material independent of the air bag and having a rim portion adapted for attachment to the support frame and having a side wall portion suspended from the support frame and reaching between the spaced apart inflator supports whereby upon actuation of the inflator the inflation gas is contained by the liner and exhausted through the open mouth; and
a liner support loop suspended from the support frame side walls intermediate the support frame end walls to support the liner side wall portion.

5. The air bag module of claim 4 further characterized by the liner support loop being a metal strap attached to the support frame.

6. The air bag module of claim 4 further characterized by the liner support loop being a loop of flexible sheet material sewn to the rim portion of the liner.

7. An air bag module for a motor vehicle, comprising:

a cylindrical inflator having spaced apart end walls and a cylindrical side wall;

a support frame defining an open mouth for the mounting of an air bag and having spaced apart opposing end walls and spaced apart opposing side walls;

an inflator support depending from each of the end walls to support the inflator beneath the support frame and being spaced away from one another;

an air bag mounted on the support frame;

a liner of flexible sheet material independent of the air bag and having a rim portion adapted for attachment to the support frame and having a side wall portion suspended from the support frame and reaching between the spaced apart inflator supports whereby upon actuation of the inflator the inflation gas is contained by the liner and exhausted through the open mouth to inflate the air bag, and a heat shield of sheet metal mounted on the side wall portion of the liner to shield the flexible sheet material of the liner from the inflator.

8. The combination of claim 7 further characterized by the heat shield being of corrugated sheet metal so that the corrugations assure a space between the liner and the inflator.

* * * * *